United States Patent [19]
Quanquin et al.

[11] 3,776,713
[45] Dec. 4, 1973

[54] KCL-PHOSPHATE GRANULES
[75] Inventors: Bernard Quanquin; Honore Trimbach, both of Grande Couronne; Pierre Dumont, Cleon, all of France
[73] Assignee: Azote et Produits Chimiques S.A., Toulouse, France
[22] Filed: June 9, 1969
[21] Appl. No.: 831,464

[30] Foreign Application Priority Data
June 20, 1968 France ............................. 68155735

[52] U.S. Cl. ...................... 71/33, 71/53, 71/64 DA
[51] Int. Cl. ............................................ C05b 19/00
[58] Field of Search .................... 71/64 DA, 64 DB, 71/33, 153, 63

[56] References Cited
UNITED STATES PATENTS
3,415,638  12/1968  Helmsley et al. ............. 71/64 DB X FOREIGN PATENTS OR APPLICATIONS
1,395,837  3/1965  France ................................. 71/36

Primary Examiner—Charles N. Hart
Attorney—I. William Millen

[57] ABSTRACT

To produce hard, abrasion-resistant, substantially spherical granules consisting essentially of potassium chloride and phosphate, particulate potassium chloride is agglomerated with an aqueous solution containing as the essential binding agent, a complex mixture of ortho-phosphates and condensed phosphates produced by reacting potassium chloride in orthophosphoric acid at above 180° C. To improve the granulation yield having the desired particle sizes, ammonia is added to the mixture to be granulated either before or during granulation.

14 Claims, 1 Drawing Figure

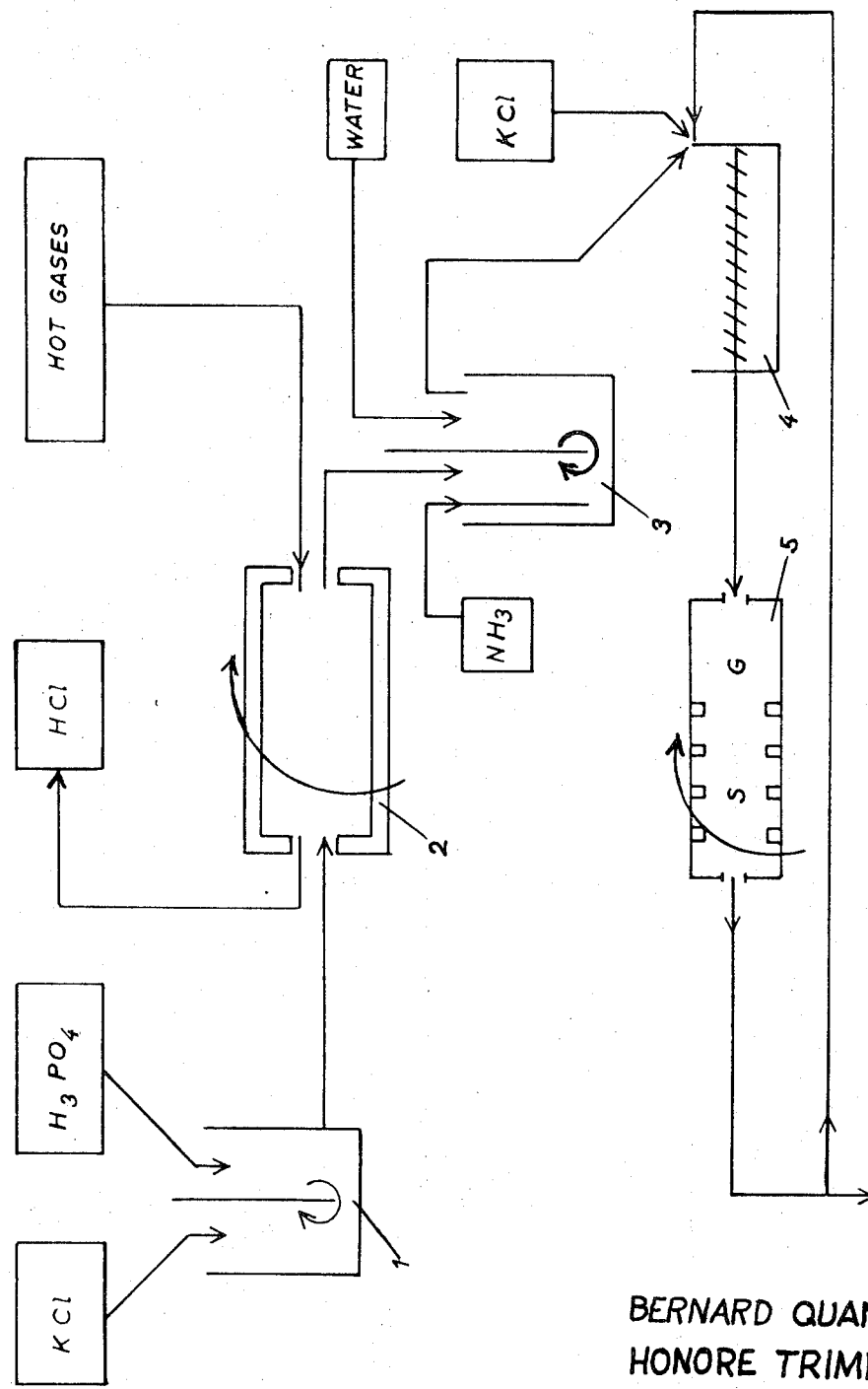

KCL-PHOSPHATE GRANULES

BACKGROUND OF THE INVENTION

This invention relates to a process for agglomerating and granulating binary fertilizers containing a high percentage of potassium chloride into substantially spherical granules having high values of hardness and abrasion resistance during handling and storage.

These fertilizers, containing phosphates in addition to $K_2O$, can be used as such, either for fertilizing certain types of soils or for cultivating certain plants. However, they are primarily and advantageously used as $K_2O$-containing material in bulk blending stations where fertilizers containing variable percentages of N, $P_2O_5$ and $K_2O$ are mixed to order. As in these stations, N and $P_2O_5$-bearing material are generally used in a granular form, potassium chloride must also be granulated in order to obtain homogeneous mixtures. Unfortunately, though, the granulation of these KCl fines has proved to be a problem in the past.

Whereas conventional granulating processes are generally used in the fertilizer industry, such as prilling, growing of a nucleus by coating with successive layers, and agglomerating, such conventional processes are beset with difficulties when applied to the agglomeration of fines of predominantly KCl. For these reasons, improved methods have been sought; for example, it has been proposed to granulate potassium chloride fines by high pressure compaction. A mixture of dampened or dried fines is compressed between rollers under very high pressures of 7,000 to 35,000 $Kg/cm^2$ producing a more or less homogeneous sheet which is then crushed to the desired particle size. This method is difficult to control since there are numerous sensitive operating conditions: temperature, particle size, percent humidity, etc. Furthermore, energy expenses are very high and the capacity of the granulator is low. Moreover, the granules obtained by compaction are flat and angular in shape. Thus, they are troublesome to use, and when mixed with spherical granules in bulk blending stations they tend to segregate, which is a serious shortcoming.

SUMMARY OF INVENTION

A principal object of this invention, therefore, is to provide a novel improved method of forming granules rich in KCl.

Another object is to provide hard, abrasion-resistant, substantially spherical granules rich in KCl.

Upon further study of the specification and claims, other objects and advantages of the present invention will become apparent.

To attain these objects, there is granulated a mixture of potassium chloride particles and an aqueous solution of the reaction product obtained by the reaction of potassium chloride with phosphoric acid. The aforesaid reaction is conducted at above 180° C, with the starting quantities of potassium chloride and phosphoric acid being such that the molar ratio $K_2O/P_2O_5$ in the reaction product is not less than 1:1 and preferably 1–2.25, i.e., 1:1 to 2.5 : 1 for ratios higher than 3:1, no more condensed phosphates are obtained in the reaction product.

The resultant granules are hard, nonhygroscopic and do not break or wear during storage, spreading and handling.

BRIEF DESCRIPTION OF THE DRAWINGS

The attached drawing is a schematic flowsheet illustrating an overall preferred embodiment of the process of this invention.

DETAILED DISCUSSION OF THE INVENTION

The process of this invention permits the production of binary fertilizers in which the $K_2O/P_2O_5$ weight ratio may vary from 1:1 to 8:1. Thus, fertilizers containing up to 54 percent $K_2O$, or fertilizers more concentrated in $P_2O_5$ and having total nutrient values up to 73 percent can be granulated at high yields into substantially spherical granules of marketable size, i.e., ranging between 2 and 4 mm. The higher the concentration of $K_2O$ in the binary fertilizers, the more suitable they are for use as $K_2O$ components in bulk blending stations.

The reaction product of KCl and $H_3PO_4$ obtained at above 180° C is a complex mixture of orthophosphates and condensed phosphates, i.e., pyrophosphates, polyphosphates and metaphosphates optionally containing small quantities of unreacted phosphoric acid or potassium chloride. The quantity of condensed phosphates and metaphosphates increases with temperature and at about 700° C, the mixture comprises essentially potassium metaphosphate only. At reaction temperatures lower than 180° C, the mixture contains practically no condensed phosphates.

The reaction is preferably conducted at 180°–300° C, especially 200°–250° C. In the latter case, so that the reaction mixture contains condensed phosphates, KCl and $H_3PO_4$ are reacted for at least 20 minutes. At higher temperatures the residence times can, of course, be less, the overall minimum residence times for all temperatures being about 30 to 10 minutes, the lower the temperature, the longer the time.

The granulating characteristics of reaction products obtained at temperatures higher than 300° C are not noticeably improved, but the water solubility of $K_2O$ and $P_2O_5$ is decreased while heating expenses are considerably increased. For the above reasons it is, in practice, preferred to react KCl and $H_3PO_4$ at temperatures lower than 300° C. However, if an already existing metaphosphate unit is available, metaphosphate solutions can well be used for granulating potassium chloride, the savings in plant investment costs being paramount in this instance.

When adding water to the reaction product, there is obtained a more or less viscous solution optionally containing solids in suspension.

The molten reaction product and the necessary quantity of water can be simultaneously introduced in the granulator, but it is preferred to add cold water first to the molten reaction product to obtain a solution having a temperature of about 90° to 100° C and which is then introduced into the granulator. The enthalpy of the solution facilitates the granulation and subsequent drying of the granules. Whereas a previously prepared, ambient-temperature mixture of phosphates can be utilized, the process is less economical as it is either necessary to dissolve the relatively cold mixture in hot water or to supply more heat during the granulation and drying steps. Likewise when using previously prepared potassium metaphosphate, it is either necessary to dissolve with hot water or to supply additional heat during granulation.

As another aspect of this invention, it has been discovered that the granulation yield is always improved when ammonia is introduced into the mixture to be granulated. The quantity of ammonia introduced should preferably be equal to the stoichiometric quantity necessary to neutralize the first acidity of the free phosphoric acid present in the reaction product, i.e., to produce $NH_4H_2PO_4$. If less ammonia is added, the improvement in yield is less, and if more ammonia is used, there will be ammonia losses in the subsequent drying step.

Ammonia is preferably introduced in the phosphate solution before granulation but it can also be introduced separately into the granulator during the granulation. The ammonia can be added as a gas or as an aqueous solution of any concentration.

A certain amount of fines are preferably recycled, the recycling ratio varying according to the formula of the fertilizer treated. A recycling ratio of 3/1 was found suitable for granulating fertilizers of nutrient ratio ranging from 0–1–5 to 0–1–8, the figures conventionally representing weight percent of nitrogen, phosphorous and potassium respectively.

The quantity of water supplied must be sufficient to give a semi-pasty mixture. For example, when the fines recycling ratio is 3/1, a quantity of water of 24 to 28 percent by weight is used for granulating a 0–1–5 to 0–1–8 type fertilizer. This water can be entirely supplied by the phosphate solution, but part of it can be directly introduced in the granulator.

The granulation process of the invention can be conducted in any granulation unit commonly used for wet agglomeration processes : rotary drums, granulating pans, pug mills or spray-type granulators. Furthermore, both steps of (a) mixing potassium chloride particles with the aqueous solution of condensed phosphates (optionally with recycled fines), and (b) granulating can be performed in the very same apparatus. Alternatively, mixing and a course granulation can take place in a first apparatus such as a paddle mixer, and then the coarse granules can be formed into a more spherical shape in a second apparatus such as a rotary drum or pan. If necessary, a separate dryer is provided after the granulation unit.

DETAILED DESCRIPTION OF DRAWING

Referring now to the attached drawing, the following description of a preferred overall embodiment of the invention will facilitate a better understanding of same. In the drawing, potassium chloride and phosphoric acid are fed to mixing tank 1 equipped with an agitator. The resultant mixture is then passed to furnace 2, being a rotary furnace heated by combustion gases and having an acid and heat-resistant lining, e.g., refractory brick. Alternatively, a heated vat or an electric furnace can be used, especially when heating at temperatures higher than 300° C. (It is also possible, according to another embodiment of the invention, to eliminate the mixing tank, and feed starting products directly to the furnace.) The gaseous product evolving during reaction and containing essentially hydrochloric acid and steam is treated by a conventional absorption system to recover hydrochloric acid. The molten reaction product is discharged from the furnace directly into tank 3 also equipped with an agitator.

Tank 3 is simultaneously fed with water and ammonia, and the resultant hot viscous solution of phosphates is fed together with potassium chloride and recycled fines to one end of paddle mixer 4. From this mixer 4, which thoroughly and homogeneously kneads the mixture, there are obtained coarse granules. To improve their shape, the wet coarse granules are fed to a rotary drying drum 5 which, according to the embodiment illustrated is divided into a first granulating section and a second drying section. In the granulating section G, which receives the coarse granules, the inner surface is smooth and the granules rolling over each other form a moving bed. The second section S is equipped with scoops for lifting the granules and allowing them to fall through a stream of hot gas. The gaseous stream flows through the two sections of the rotary drum preferably concurrently to the granules. Alternatively, this two-section rotary drum can be replaced by a drying drum having an entirely smooth inner surface, or by two drums: one for improving the shape of the granules and one for drying.

It is quite obvious that the unit illustrated in the drawing can be substantially modified while still being satisfactory for the process. For example, the paddle mixer 4 and the rotary drying drum 5 can be replaced by a spray-type granulator. In the latter granulator, the solution obtained in tank 3, optionally mixed with a portion of recycled fines and the potassium chloride to be granulated, is sprayed onto a moving bed of nuclei comprising fines obtained by classifying the finished granules and also the remaining potassium chloride particles to be granulated.

Likewise, the ammonia injection device in tank 3 can be eliminated with the paddle mixer 4 replaced by an ammoniator comprising a drum containing ammonia injecting conduits opening into the bed of granules, or by a drum the walls of which are fitted with valves for the introduction of ammonia. The ammoniator can be optionally followed by a drier.

Dry finished granules are sent to a classifying apparatus (not shown). A marketable produce with a particle size ranging from 2 to 4 mm is collected, and coarse granules are ground and recycled with the fines to the granulation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Granulation was performed in a unit such as that shown on the attached drawing. In tank 1 104 kg of phosphoric acid containing 50 percent $P_2O_5$ and 260 kg of potassium chloride containing 60 percent $K_2O$ were mixed and the resulting mixture was fed to furnace 2 heated at a temperature of 250° C. The molten reaction product was passed to tank 3 and simultaneously there was introduced water in an amount to yield 240 kg $H_2O$ in the mixture.

During dissolution of the molten reaction product, 10 kg of ammonia were injected into tank 3. The resultant solution was introduced into paddle mixer 4 together with 606 kg of potassium chloride and 3,000 kg of recycled fines. The product leaving the rotary dryer 5 contained 33 percent of marketable granules (ranging from 2 to 4 mm) having the following analysis: 52.3 percent of $K_2O$, 99.5 percent being water-soluble; 10.4 percent of $P_2O_5$ 90.8 percent being water-soluble and citrate-soluble; and 0.67 percent of $NH_3$. Accordingly, the nutrient ratio in the marketable granules was 0-1-5.

EXAMPLE 2

The conditions were the same as in Example 1, except that 1,500 kg of potassium chloride were introduced in the paddle mixer 4 instead of 606 kg. The product leaving the rotary drying drum 5 contained 18 to 20 percent of marketable granules, had a nutrient ratio of 0-1-8, and contained 54.8 percent of $K_2O$, 99.3 percent being water-soluble; and 7.1 percent of $P_2O_5$ 84.5 percent being water-soluble and citrate-soluble.

EXAMPLE 3

Mixed in tank 1 were 368 kg of $P_2O_5$ introduced as 48 percent $H_3PO_4$ and 614 kg of potassium chloride containing 60 percent $K_2O$; and the mixture was then sent to furnace 2 and heated to 240° C. To the molten reaction product flowing out of the furnace, water was added in such a quantity that the total quantity of water in tank 3 was 280 kg. During dissolution, 18 kg of ammonia were injected. The solution obtained was introduced into paddle mixer 4 together with 3,000 kg of recycled fines. After drying and classifying there were obtained 30 percent of marketable granules having a nutrient ration of 0-1-1 with the following composition:
36.8 percent of $K_2O$, 99.3 percent being water-soluble,
36.8 percent of $P_2O_5$ 97.2 percent being water-soluble and citrate-soluble,
1.8 percent of ammonia.

EXAMPLE 4

Mixed in tank 1 were 177 kg of $P_2O_5$ introduced as 48 percent phosphoric acid and 442 kg of 60 percent potassium chloride and the mixture was introduced in furnace 2 and heated to 240° C. The molten reaction product was fed into tank 3 together with a quantity of water such that the mixture contained 410 kg of water. The resultant solution was introduced into paddle mixer 4 together with 1,030 kg of potassium chloride and 5,000 kg of recycled fines. After drying and classifying, 25 percent of marketable granules were obtained having a nutrient ratio of 0-1-5.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:
1. A process for producing hard, non-hygroscopic granules consisting essentially of potassium chloride and phosphates, said process comprising granulating a mixture of particulate potassium chloride and an aqueous solution of a reaction product of essentially only KCl and phosphoric acid, said reaction product having a $K_2O/P_2O_5$ molar ratio of at least 1:1, and having been reacted at above 180° C., said aqueous solution of reaction product functioning as a binder for said particulate potassium chloride.

2. A process as defined by claim 1 wherein said molar ratio is 1:1 to 2.25:1.

3. A process as defined by claim 1 wherein said reaction product is reacted at less than 300° C.

4. A process as defined by claim 2 wherein said reaction product is reacted at less than 300° C.

5. A process as defined by claim 1 wherein said reaction product is reacted at 200° – 250° C.

6. A process as defined by claim 2 wherein said reaction product is reacted at 200° – 250° C.

7. A process as defined by claim 1 comprising the further step of admixing ammonia to said mixture to be granulated to increase the granulation yield.

8. A process as defined by claim 2 comprising the further step of admixing ammonia to said mixture to be granulated to increase the granulation yield.

9. A process as defined by claim 3 comprising the further step of admixing ammonia to said mixture to be granulated to increase the granulation yield.

10. A process as defined by claim 6 comprising the further step of admixing ammonia to said mixture to be granulated to increase the granulation yield.

11. A process as defined by claim 1, wherein said aqueous solution of reaction product is formed prior to the granulation step.

12. A process as defined by claim 1, wherein said reaction product consists essentially of a mixture of orthophosphates and condensed phosphates.

13. A process as defined by claim 1, wherein said reaction product consists essentially of potassium metaphosphate.

14. A process as defined by claim 11, wherein the reaction product and water is added thereto to obtain a solution having a temperature of about 90° to 100° C., said solution being introduced into the granulating step.

* * * * *